(12) United States Patent
Lin

(10) Patent No.: US 11,757,542 B2
(45) Date of Patent: Sep. 12, 2023

(54) PROBE ANTENNA DETERMINATION METHOD AND APPARATUS

(71) Applicant: VIVO MOBILE COMMUNICATION CO., LTD., Dongguan (CN)

(72) Inventor: Hui Lin, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/702,750

(22) Filed: Mar. 23, 2022

(65) Prior Publication Data

US 2022/0216928 A1 Jul. 7, 2022

Related U.S. Application Data

(63) Continuation of application No. PCT/CN2020/114555, filed on Sep. 10, 2020.

(30) Foreign Application Priority Data

Sep. 27, 2019 (CN) .......................... 201910927855.1

(51) Int. Cl.
*H04B 17/391* (2015.01)
*H01Q 3/26* (2006.01)
*H04B 17/15* (2015.01)

(52) U.S. Cl.
CPC .......... *H04B 17/15* (2015.01); *H04B 17/3912* (2015.01)

(58) Field of Classification Search
CPC ................... H04B 17/15; H04B 17/30; H04B 17/173912; H04B 17/391; H04B 17/3912; H01Q 3/26; H01Q 3/2505
See application file for complete search history.

(56) References Cited

U.S. PATENT DOCUMENTS 8,412,112 B2 * 4/2013 Foegelle ............ H04B 17/3911
455/67.11
9,024,828 B2 * 5/2015 Reed ...................... G01R 29/10
343/703
(Continued)

FOREIGN PATENT DOCUMENTS

CN 103856272 A 6/2014
CN 106034308 A 10/2016
(Continued)

OTHER PUBLICATIONS

International Search Report issued in corresponding International Application No. PCT/CN2020/114555, dated Nov. 27, 2020, 4 pages.
(Continued)

*Primary Examiner* — Blane J Jackson
(74) *Attorney, Agent, or Firm* — IPX PLLC

(57) ABSTRACT

Embodiments of the present disclosure provide probe antenna determination methods and apparatuses. An exemplary method includes: determining N probe antenna models from preset M probe antenna models based on signal characteristic parameters of a first signal, where the first signal is a signal obtained after a transmit signal of an analog system is processed by a wireless channel model, the signal characteristic parameters include at least one of the following: a radiation energy value of the first signal in each direction and an angle power spectrum density of the first signal, the N probe antenna models are used to determine a probe antenna for testing a device under test, and both M and N are positive integers.

15 Claims, 6 Drawing Sheets

(a)

(b)

(56) References Cited

U.S. PATENT DOCUMENTS

| | | | |
|---|---|---|---|
| 9,660,739 B2* | 5/2017 | Reed | H04B 17/12 |
| 10,958,361 B2* | 3/2021 | Maruo | H04B 17/102 |
| 10,969,427 B2* | 4/2021 | Rowell | G01R 31/3025 |
| 2012/0282863 A1* | 11/2012 | Guo | H04B 17/391 |
| | | | 455/67.12 |
| 2013/0027256 A1* | 1/2013 | Guo | H04W 24/06 |
| | | | 343/703 |
| 2013/0059545 A1 | 3/2013 | Kyoesti et al. | |
| 2015/0099473 A1 | 4/2015 | Szini et al. | |
| 2018/0212695 A1 | 7/2018 | Kyrolainen et al. | |
| 2020/0213018 A1* | 7/2020 | Qi | H04B 17/15 |
| 2021/0314075 A1* | 10/2021 | Qi | H04B 17/29 |

FOREIGN PATENT DOCUMENTS

| | | |
|---|---|---|
| CN | 106160892 A | 11/2016 |
| CN | 107239602 A | 10/2017 |
| CN | 109617623 A | 4/2019 |
| CN | 109889239 A | 6/2019 |

OTHER PUBLICATIONS

VIVO, "On NR FR1 MPAC Probe Layout", 3GPP TSG-RAN WG4 Meeting #92 R4-1908421, Aug. 30, 2019.

QUALCOMM Incorporated, "Environmental conditions for NR FR1 MIMO OTA", 3GPP TSG-RAN4 #92 R4-1909579, Aug. 30, 2019.

First Office Action issued in related Chinese Application No. 201910927855.1, dated Jul. 28, 2021, 6 pages.

Extended European Search Report issued in related European Application No. 20869383.8, dated Oct. 10, 2022, 11 pages.

Yang et al "Probe Subset Selection in 3D Multiprobe OTA Setup" 2018 IEEE 29th Annual International Symposium on Personal, Indoor and Mobile Radio Communications (PIMRC), IEEE, Sep. 9, 2018, pp. 1-6.

Fan et al "Probe Selection in Multiprobe OTA Setups" IEEE Transactions on Antennas and Propagation, vol. 62, No. 4, Apr. 2014, 12 pages.

Keysight Technologies, "3D MPAC System Proposal for FR1 NR MIMO OTA Testing", 3GPP TSG-RAN WG4 Meeting #90, R4-1900498, Feb. 2019, 8 pages.

* cited by examiner

A probe antenna determination apparatus determines N probe antenna models from preset M probe antenna models based on signal characteristic parameters of a first signal ⎯⎯ 201

FIG. 3

The probe antenna determination apparatus determines at least one direction range based on the signal characteristic parameters of the first signal ⎯⎯ 201a

↓

The probe antenna determination apparatus determines N probe antenna models corresponding to all direction ranges from the M probe antenna models ⎯⎯ 201b

FIG. 4

The probe antenna determination apparatus determines at least one direction range based on the signal characteristic parameters of the first signal ⎯⎯ 201a

↓

The probe antenna determination apparatus determines, based on the at least one direction range, an angle range corresponding to each of the at least one direction range from each distribution angle of the M probe antenna models ⎯⎯ 201c

↓

The probe antenna determination apparatus determines N probe antenna models corresponding to all angle ranges from the M probe antenna models ⎯⎯ 201b1

FIG. 5

PROBE ANTENNA DETERMINATION METHOD AND APPARATUS

CROSS-REFERENCE TO RELATED APPLICATIONS

This application is a continuation of International Application No. PCT/CN2020/114555, filed Sep. 10, 2020, which claims priority to Chinese Patent Application No. 201910927855.1, filed Sep. 27, 2019. The entire contents of each of the above-referenced applications are expressly incorporated herein by reference.

TECHNICAL FIELD

Embodiments of the present disclosure relate to the field of communications technologies, and in particular, to a probe antenna determination method and apparatus.

BACKGROUND

In order to ensure communication performance of the antenna in a real scenario, a performance test of the antenna is usually required during the production process.

Currently, an antenna test system 10 shown in FIG. 1 may be used to perform a multi-antenna multiple-input multiple-output (MIMO) performance test. Specifically, when the antenna test system 10 shown in FIG. 1 is used for testing, an analog system 11 may transmit an analog signal generated thereof to a MIMO channel simulator 12, and then the MIMO channel simulator 12 may generate a plurality of MIMO analog wireless channels based on the analog signal, and carries the analog signal on these MIMO analog wireless channels to be transmitted to a probe antenna 14 in a fully anechoic chamber 13, so that the probe antenna 14 may send these MIMO analog wireless channels to a device under test 15. In this way, a real MIMO communication scenario is simulated. Probe antennas in a fully anechoic chamber are usually evenly distributed in a 360-degree ring. For example, as shown in (a) of FIG. 2, 8 probe antennas are evenly distributed in the fully anechoic chamber in a 360-degree ring, or as shown in (b) of FIG. 2, 16 probe antennas are evenly distributed in the fully anechoic chamber in a 360-degree ring.

However, since the quantity of channels of the MIMO channel simulator is proportional to the quantity of probe antennas, when the MIMO channel simulator has a limited quantity of channels, the quantity of probe antennas connected to the MIMO channel simulator is also limited. A distribution density of probe antennas is proportional to the test accuracy of the antenna test system, and therefore, when the quantity of the probe antennas is limited, the distribution density of the probe antennas is also small, resulting in a low test accuracy of the antenna test system.

SUMMARY

According to a first aspect, an embodiment of the present disclosure provides a probe antenna determination method, applied to a probe antenna determination apparatus, and the method includes: determining N probe antenna models from preset M probe antenna models based on signal characteristic parameters of a first signal, where the first signal is a signal obtained after a transmit signal of an analog system is processed by a wireless channel model, the signal characteristic parameters of the first signal include at least one of the following: a radiation energy value of the first signal in each direction and an angle power spectrum density of the first signal, the N probe antenna models are used to determine a probe antenna for testing a device under test, and both M and N are positive integers.

According to a second aspect, an embodiment of the present disclosure provides a probe antenna determination apparatus, and the probe antenna determination apparatus includes a determination module. The determination module is configured to determine N probe antenna models from preset M probe antenna models based on signal characteristic parameters of a first signal, where the first signal is a signal obtained after a transmit signal of an analog system is processed by a wireless channel model, the signal characteristic parameters of the first signal include at least one of the following: a radiation energy value of the first signal in each direction and an angle power spectrum density of the first signal, the N probe antenna models are used to determine a probe antenna for testing a device under test, and both M and N are positive integers.

According to a third aspect, an embodiment of the present disclosure provides a probe antenna determination apparatus, and the probe antenna determination apparatus includes: a processor, a memory, and a computer program stored in the memory and executable on the processor, when the computer program is executed by the processor, steps of the probe antenna determination method according to the foregoing first aspect are implemented.

According to a fourth aspect, an embodiment of the present disclosure provides a non-transitory computer-readable storage medium, and the non-transitory computer-readable storage medium stores a computer program, when the computer program is executed by the processor, steps of the probe antenna determination method according to the foregoing first aspect are implemented.

BRIEF DESCRIPTION OF DRAWINGS

FIG. 3 is a first schematic diagram of a probe antenna determination method according to an embodiment of the present disclosure;

FIG. 4 is a second schematic diagram of a probe antenna determination method according to an embodiment of the present disclosure;

FIG. 5 is a third schematic diagram of a probe antenna determination method according to an embodiment of the present disclosure;

DETAILED DESCRIPTION

Figure 1:
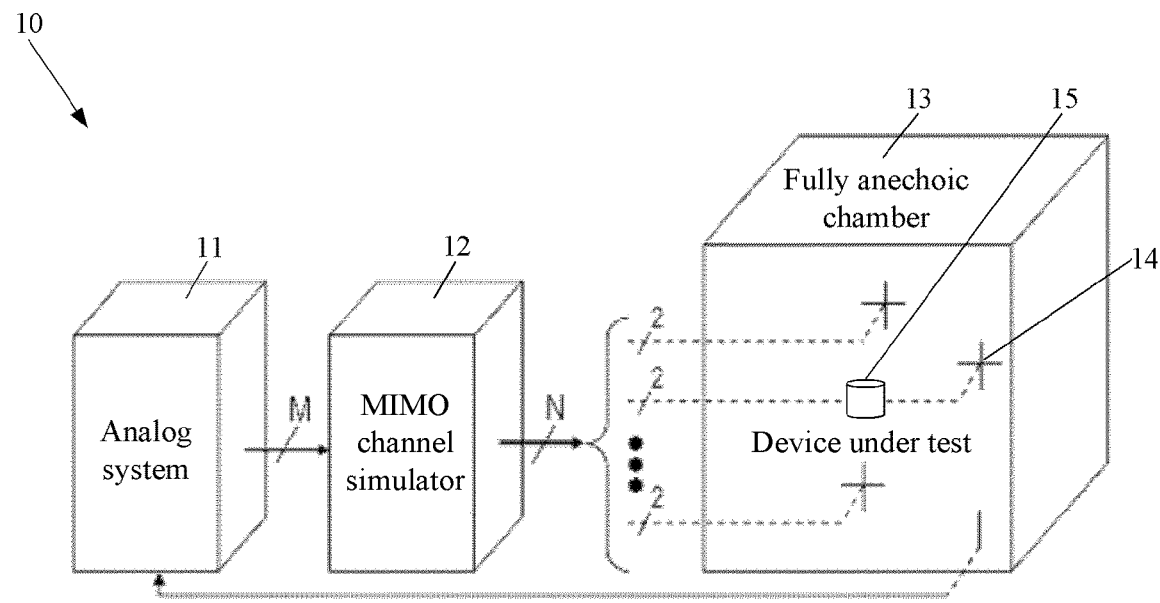
FIG. 1 is a schematic structural diagram of an antenna test system according to an embodiment of the present disclosure.
Figure 2:
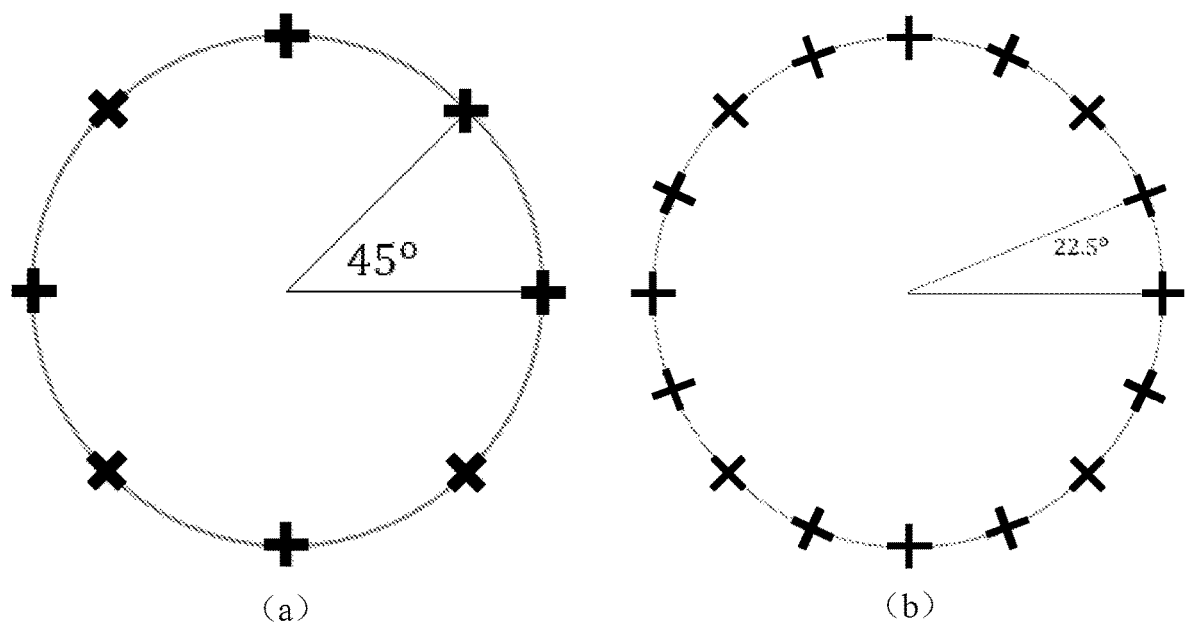
FIG. 2 is a schematic diagram of a distribution of a probe antenna according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

The term "and/or" in this specification describes an association relationship of associated objects, indicating that three relationships may exist. For example, A and/or B may indicate three cases: only A exists, both A and B exist, and only B exists. A character "/" in this specification indicates an "or" relationship between associated objects. For example, A/B indicates A or B.

In the specification and claims of the present disclosure, the terms such as "first" and "second" are used to distinguish between different objects, but are not used to describe a particular sequence of the objects. For example, a first signal and a second signal are used to distinguish between different signals, and are not used to describe a specific sequence of signals.

In the embodiments of the present disclosure, the term such as "exemplary" or "for example" is used to indicate an example, an instance, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

In the description of the embodiments of the present disclosure, unless otherwise specified, the meaning of "a plurality of" means two or more. For example, "a plurality of elements" means two or more elements.

According to a probe antenna determination method and apparatus provided in the embodiments of the present disclosure, N probe antenna models (used to determine a probe antenna for testing a device under test) may be determined from preset M probe antenna models based on signal characteristic parameters (including at least one of the following: a radiation energy value of the first signal in each direction and an angle power spectrum density of the first signal) of a first signal (a signal obtained after a transmit signal of an analog system is processed by a wireless channel model), and both M and N are positive integers. In this solution, since the signal characteristic parameters of the first signal may accurately represent distribution of radiation energy of the first signal in various directions, the probe antenna determination apparatus may accurately simulate a radiation scenario of the first signal in a real environment based on the signal characteristic parameters of the first signal. In this way, N probe antenna models that can send the first signal more accurately may be selected based on the simulated radiation scenario, so that the probe antenna for testing the device under test may be determined based on the N probe antenna models. Therefore, these probe antennas may send the first signal more accurately, and the test accuracy of the antenna test system may be improved.

The probe antenna determination apparatus in the embodiments of the present disclosure may be an electronic device. The electronic device in the embodiments of the present disclosure may be a mobile terminal or a non-mobile terminal. For example, the mobile terminal may be a mobile phone, a tablet computer, a notebook computer, a palmtop computer, a vehicle-mounted terminal, a wearable device, an ultra-mobile personal computer (UMPC), a netbook, a personal digital assistant (PDA), or the like. The non-mobile terminal may be a personal computer (PC) or the like. This is not specifically limited in the embodiments of the present disclosure.

An execution body of the probe antenna determination method provided in the embodiments of the present disclosure may be the foregoing probe antenna determination apparatus, or a functional module and/or a functional entity that can implement the probe antenna determination method in the probe antenna determination apparatus. Specifically, this may be determined based on an actual use requirement, and is not limited in this embodiment of the present disclosure. Taking the probe antenna determination apparatus as an example, the following describes the probe antenna determination method provided in the embodiments of the present disclosure.

With the development of communications technologies, starting from the $4^{th}$ Generation Long Term Evolution (4G LTE) system, multi-antenna MIMO has become a basic function of the mobile communication system. In order to ensure communication performance (such as throughput and signal reception capability) of an electronic device in a real MIMO scenario, the communication performance of the electronic device in the MIMO scenario needs to be tested before delivery. A multi-probe antenna fully anechoic chamber is a commonly used test scheme.

According to traditional theoretical analysis, in order to meet the test accuracy, a minimum quantity K of probe antennas that are evenly distributed in a 360-degree ring and that are required by the multi-probe antenna fully anechoic chamber may be expressed as:

$$K = 2\text{ceil}\left(\frac{\pi D}{\lambda}\right) + 1$$

D may represent a maximum distance of a plurality of antennas in the device under test (for example, a mobile phone or a tablet computer), and the maximum distance may be approximately equal to a physical size of the device under test. $\lambda$ represents a wavelength of a wireless signal under test, and ceil ( ) indicates rounded up.

For example, as shown in Table 1, Table 1 is a calculation relation table of a quantity of probe antennas that are distributed in a 360-degree ring and that are required for test signals of different frequencies in a case that the maximum distance of the plurality of antennas in the device under test is 20 centimeters (cm).

TABLE 1

| Frequency | 2.6 GHz | 3.5 GHz | 7.125 GHz |
| --- | --- | --- | --- |
| λ(m) | 0.015 | 0.086 | 0.042 |
| D/λ | 1.73 | 2.33 | 4.75 |
| K | 13 | 17 | 31 |

As shown in Table 1, in a case that devices under test have a same size, the higher the frequency of the test signal, the more probe antennas are required for the test. Correspondingly, if the size of the device under test increases, that is, a maximum distance D of the plurality of antennas in the device under test increases, the quantity of probe antennas required for the test may also increase.

However, with the development of mobile communication, a frequency range of the signal is continuously increasing, the 4G LTE system usually operates in a band below 2.6 GHz, while an operating band range of the $5^{th}$ Generation New Radio (5G NR) System may be extended to 7.125 GHz. Therefore, for a same device under test, a quantity of probe antennas required for a test signal in the frequency of 7.125 GHz is much higher than a quantity of probe antennas required for a test signal in the frequency of 2.6 GHz. For example, for a commonly used mobile phone with a diagonal distance of about 20 cm, 31 probe antennas are required for a test signal of 7.125 GHz, and 13 probe antennas are required for a test signal of 2.6 GHz. In addition, for a larger-sized electronic device (such as a tablet computer or a notebook computer), a larger quantity of probe antennas are required for the test.

On the other hand, since the quantity of channels of the MIMO channel simulator is proportional to the quantity of probe antennas, when a large quantity of probe antennas are required for the test, the large quantity of channels of the MIMO channel simulator are also required for the test. Affected by device manufacturing, when a specific quantity of probe antennas are required for the test, there may not be a channel simulator capable of connecting these probe antennas at the same time, thus the test cannot be performed.

In this embodiment of the present disclosure, before testing the communication performance of the device under test, the probe antenna for testing the device under test may be determined through a probe antenna determination apparatus, and then these probe antennas are used to test the communication performance of the device under test. Specifically, the probe antenna determination apparatus may first analyze the signal (for example, the first signal in the embodiments of the present disclosure) obtained after a transmit signal of an analog system is processed by a wireless channel model, so as to obtain signal characteristic parameters of the signal, and then the probe antenna determination apparatus may determine at least one probe antenna model from the preset plurality of probe antenna models (corresponding to probe antennas set in a multi-probe antenna fully anechoic chamber) based on the signal characteristic parameters of the signal. In this way, the probe antenna used for testing the device under test may be determined, based on the at least one probe antenna model, from a test environment in which the antenna under test is located. Since these probe antennas are determined based on the signal characteristic parameters of the signal, these probe antennas may more accurately send a signal used for testing the device under test, thereby improving the test accuracy of the antenna test system.

The following describes the probe antenna determination method provided in the embodiments of the present disclosure by using examples with reference to the accompanying drawings.

As shown in FIG. 3, an embodiment of the present disclosure provides a probe antenna determination method, and the method includes the following step 201.

Step 201. A probe antenna determination apparatus determines N probe antenna models from preset M probe antenna models based on signal characteristic parameters of a first signal.

The foregoing first signal may be a signal obtained after a transmit signal of an analog system is processed by a wireless channel model, the signal characteristic parameters of the first signal may include at least one of the following: a radiation energy value of the first signal in each direction and an angle power spectrum density of the first signal, the foregoing N probe antenna models may be used to determine a probe antenna for testing a device under test, and both M and N are positive integers.

In this embodiment of the present disclosure, the probe antenna determination apparatus may determine the foregoing N probe antenna models from the foregoing M probe antenna models based on the signal characteristic parameters of the first signal. In this way, the probe antenna used for testing the device under test may be determined based on the N probe antenna models. Specifically, N probe antennas corresponding to the N probe antenna models may be determined, based on the N probe antenna models, from the test environment (for example, a multi-probe antenna fully anechoic chamber) in which the device under test is located, so that the N probe antennas may be used to send the first signal to test the communication performance of the device under test.

It should be noted that, in this embodiment of the present disclosure, the angle power spectrum density of the first signal may be used to represent a correspondence between a radiation direction and radiation energy of the first signal. In other words, after the probe antenna determination apparatus obtains the angle power spectrum density of the first signal, the probe antenna determination apparatus may obtain the radiation energy value of the first signal in each direction.

In some embodiments, in this embodiment of the present disclosure, before the probe antenna determination apparatus determines the foregoing N probe antenna models from the foregoing M probe antenna models based on the signal characteristic parameters of the foregoing first signal, the probe antenna determination apparatus may first analyze the first signal to obtain the signal characteristic parameters of the foregoing first signal.

It may be understood that after the probe antenna determination apparatus obtains the signal characteristic parameters of the first signal, the probe antenna determination apparatus may obtain the correspondence between the radiation direction and the radiation energy of the first signal, that is, the probe antenna determination apparatus may obtain distribution of the radiation energy of the first signal in each direction.

In this embodiment of the present disclosure, since the distribution of the radiation energy of the signal in each direction is an important parameter representing the signal, after the probe antenna determination apparatus determines the signal characteristic parameters of the foregoing first signal, the probe antenna determination apparatus may determine, based on the signal characteristic parameters of the first signal, a probe antenna model that may send the foregoing first signal by analog more accurately from the foregoing M probe antenna models, namely, the foregoing N probe antenna models.

In this embodiment of the present disclosure, the foregoing first signal may be a signal obtained after a transmit signal of an analog system is processed by a wireless channel model and/or signal beamforming. This may be specifically determined according to an actual usage requirement, and is not limited in this embodiment of the present disclosure.

In this embodiment of the present disclosure, the foregoing preset M probe antenna models may be all or some probe antenna models set in the probe antenna determination apparatus. This may be specifically determined according to an actual usage requirement, and is not limited in this embodiment of the present disclosure.

In this embodiment of the present disclosure, a quantity of the foregoing M probe antenna models may be the same as a quantity of probe antennas set in the test environment in which the device under test is located, that is, there may be M probe antennas in the test environment in which the device under test is located.

In this embodiment of the present disclosure, the spatial distribution of the foregoing M probe antenna models may be consistent with the spatial distribution of the M probe antennas in the test environment in which the device under test is located.

It may be understood that the foregoing M probe antenna models and the M probe antennas in the test environment in which the device under test is located may have the same spatial distribution parameters such as a location and an angle in space. In other words, probe antenna models in the M probe antenna models are in one-to-one correspondence with probe antennas in the M probe antennas.

In this embodiment of the present disclosure, the probe antenna determination apparatus may determine, based on the signal characteristic parameters of the first signal, direction ranges (for example, at least one direction range in the embodiments of the present disclosure) that meet specific conditions, and then the probe antenna determination apparatus may determine, based on these direction ranges, N probe antenna models corresponding to these direction ranges from the foregoing M probe antenna models.

For example, with reference to FIG. 3, as shown in FIG. 4, the foregoing step 201 may be specifically implemented by using the following step 201a and step 201b.

Step 201a. The probe antenna determination apparatus determines at least one direction range based on the signal characteristic parameters of the first signal.

The foregoing at least one direction range may be determined from each direction radiating from the first signal, and a sum of radiation energy values in all direction ranges (e.g., a sum of radiation energy values of the first signal in all the direction ranges) may be greater than or equal to a preset threshold.

It should be noted that, in this embodiment of the present disclosure, all the direction ranges may be all direction ranges in the foregoing at least one direction range.

Step 201b. The probe antenna determination apparatus determines N probe antenna models corresponding to all the direction ranges from the M probe antenna models.

In this embodiment of the present disclosure, the probe antenna determination apparatus may determine, based on the signal characteristic parameters of the first signal, direction ranges (namely, the foregoing at least one direction range) in which the sum of the radiation energy values is greater than or equal to the foregoing preset threshold from each direction radiating from the first signal, so that the probe antenna determination apparatus may determine, from the M probe antenna models, N probe antenna models corresponding to all the direction ranges in the at least one direction range. In this way, the first signal can be sent more accurately by using the probe antennas determined based on the N probe antenna models, thereby improving test accuracy for testing the communication performance of the device under test.

In this embodiment of the present disclosure, the probe antenna determination apparatus may obtain the foregoing N probe antenna models by determining a probe antenna model corresponding to each of the at least one direction range.

In this embodiment of the present disclosure, one direction range (any one of the at least one direction range) may include one direction or a plurality of directions. This may be specifically determined according to an actual use requirement, and is not limited in the embodiments of the present disclosure.

It should be noted that, in this embodiment of the present disclosure, the foregoing N probe antenna models corresponding to all the direction ranges may include any one of the following cases: when all direction ranges in the at least one direction range are corresponding to the space in which the M probe antennas models are located, all the N probe antennas may be within these direction ranges; some of the N probe antennas are within these direction ranges, and some of the N probe antennas are outside these direction ranges (for example, a distance to a specific direction range in the at least one direction range is very close); or all of the N probe antennas are outside these direction ranges.

In this embodiment of the present disclosure, the foregoing preset threshold may be a value preset by a tester for the probe antenna determination apparatus, for example, a value such as 90% of total radiation energy of the first signal. This may be specifically determined according to an actual usage requirement, and is not limited in this embodiment of the present disclosure.

In this embodiment of the present disclosure, since the sum of radiation energy values in all the direction ranges is greater than or equal to the preset threshold, the N probe antenna models determined based on all the direction ranges may more accurately send the foregoing first signal by analog. In this way, the N probe antennas determined based on the N probe antenna models are used to test the device under test, so that the N probe antennas can send the first signal to the device under test more accurately. Thus, a use scenario of the device under test may be simulated more realistically, thereby improving the test accuracy of the antenna test system.

In this embodiment of the present disclosure, after the probe antenna determination apparatus determines the at least one direction range, the probe antenna determination apparatus may first correspond radiation directions of the first signal to distribution angles of the M probe antenna models, so as to determine, from each distribution angle of the M probe antenna models, an angle range corresponding to each of the foregoing at least one direction range; and then the probe antenna determination apparatus may accurately determine the foregoing N probe antenna models from the M probe antenna models based on the determined angle range.

For example, with reference to FIG. 4, as shown in FIG. 5, after the foregoing step 201a, the probe antenna determination method provided in the embodiments of the present disclosure may further include the following step 201c. The foregoing step 201b may be specifically implemented by using the following step 201b1.

Step 201c. The probe antenna determination apparatus determines, based on the at least one direction range, an angle range corresponding to each of the at least one direction range from each distribution angle of the M probe antenna models.

Each distribution angle of the foregoing M probe antenna models may be corresponding to each direction radiating from the first signal.

Step 201b1. The probe antenna determination apparatus determines N probe antenna models corresponding to all the angle ranges from the M probe antenna models.

It may be understood that all the angle ranges described above are all angle ranges in the angle ranges determined by the probe antenna determination apparatus based on each of the foregoing at least one direction range.

In this embodiment of the present disclosure, after the probe antenna determination apparatus determines the at least one direction range, the probe antenna determination apparatus may determine, based on the at least one direction range, an angle range corresponding to each direction range from each distribution angle of the M probe antenna models; and then the probe antenna determination apparatus may determine the foregoing N probe antenna models from the M probe antenna models based on all the determined angle ranges.

It should be noted that, in this embodiment of the present disclosure, since the radiation energy values of the signal may be described by using a direction, and distribution of the probe antenna models in space may be described by using an angle, and the direction and the angle may be corresponding to each other, after the probe antenna determination apparatus determines the foregoing at least one direction range, the probe antenna determination apparatus may correspond each of the at least one direction range to a distribution angle of the probe antenna model in space, so that an angle range corresponding to each direction range may be determined.

In this embodiment of the present disclosure, one angle range (any one of the at least one angle range) may include one angle or a plurality of angles. This may be specifically determined according to an actual use requirement, and is not limited in the embodiments of the present disclosure.

It should be noted that, in this embodiment of the present disclosure, the foregoing N probe antenna models corresponding to all the direction ranges may include any one of the following cases: all the N probe antennas may be within these angle ranges; some of the N probe antennas are within these angle ranges, and some of the N probe antennas are outside these angle ranges (for example, distributed over an angle adjacent to one of these angle ranges); or all of the N probe antennas are outside these angle ranges.

In this embodiment of the present disclosure, the foregoing at least one angle range may be a continuous angle range, and may also be a plurality of discontinuous angle ranges. This may be specifically determined according to an actual use requirement, and is not limited in this embodiment of the present disclosure.

Figure 6:
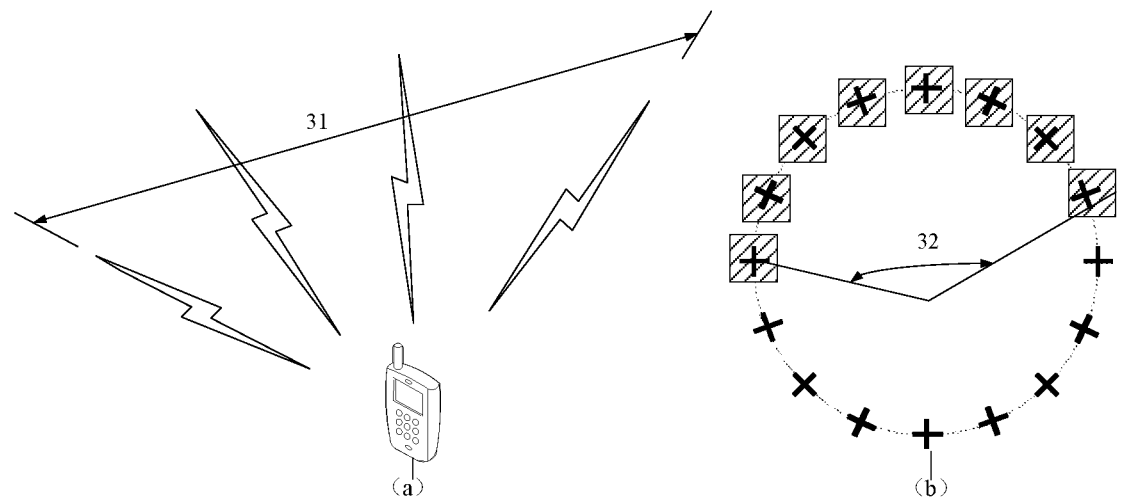
FIG. 6 is a first schematic diagram of an application of a probe antenna determination method according to an embodiment of the present disclosure.

With reference to the following FIG. 6, that the foregoing at least one angle range is a continuous angle range is used as an example for illustration.

For example, if a radiation effect of the signal (namely, the foregoing first signal) obtained after the transmit signal of the analog system is processed by the wireless channel model (and/or signal beamforming) is a radiation effect as shown in (a) of FIG. 6, the radiation energy of the first signal may be concentrated in a direction range 31 as shown in (a) of FIG. 6, that is, the radiation energy of the first signal in the direction range 31 is greater than or equal to the foregoing preset threshold. Then the probe antenna determination apparatus may determine, based on the direction range 31, an angle range 32 as shown in (b) of FIG. 6 from distribution angles of 16 probe antenna models as shown in (b) of FIG. 6. Then, the probe antenna determination apparatus may determine N probe antenna models corresponding to the angle range 32, namely, 8 continuous probe antenna models filled with shadows as shown in (b) of FIG. 6. In this way, based on the 8 probe antenna models, 8 probe antennas that are consistent with the spatial distribution of the 8 probe antenna models may be determined from the test environment in which the device under test is located, so that the 8 probe antennas may be used to test signal sending and receiving of the device under test. Therefore, a distribution density of the probe antenna for testing is maintained within an angle range corresponding to the concentration direction range of the radiation energy of the signal, so that the test accuracy of the antenna test system may be maintained.

Correspondingly, since only 8 probe antennas are required for the test, only a MIMO channel simulator of 16 channels is required to test the device under test. Therefore, compared with traditional use of 16 probe antennas, a quantity of probe antennas used is reduced, thereby reducing a quantity of required channels of the MIMO channel simulator, and reducing device requirements and costs of the test system.

Figure 7:
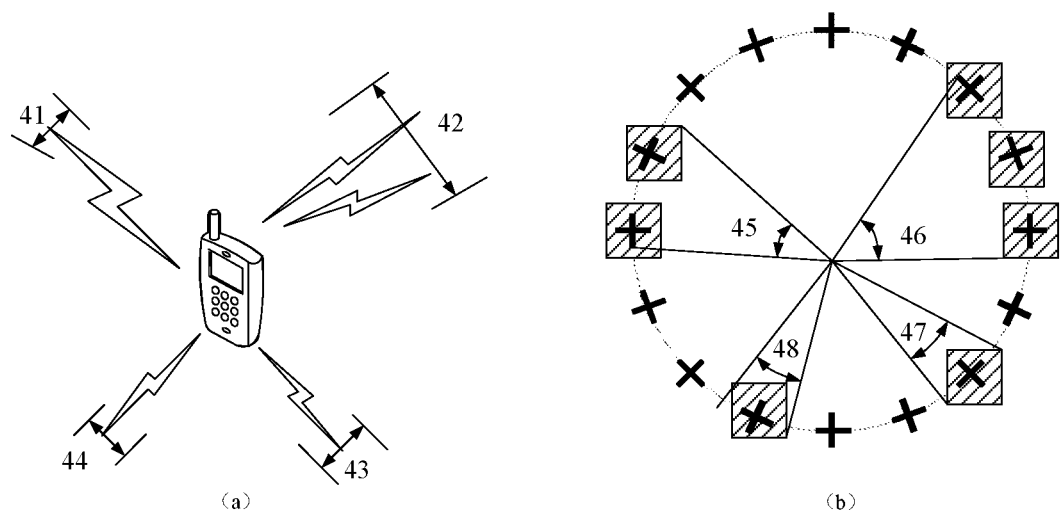
FIG. 7 is a second schematic diagram of an application of a probe antenna determination method according to an embodiment of the present disclosure.

With reference to the following FIG. 7, that the foregoing at least one angle range is a plurality of discontinuous angle ranges is used as an example for illustration.

For example, if a radiation effect of the signal (namely, the foregoing first signal) obtained after the transmit signal of the analog system is processed by the wireless channel model (and/or signal beamforming) is a radiation effect as shown in (a) of FIG. 7, most of the radiation energy of the first signal may be distributed in a direction range 41, a direction range 42, a direction range 43, and a direction range 44 as shown in (a) of FIG. 7, that is, the radiation energy of the first signal in the direction range 41, the direction range 42, the direction range 43, and the direction range 44 is greater than or equal to the foregoing preset threshold. Then the probe antenna determination apparatus may determine, based on the direction range 41, the direction range 42, the direction range 43, and the direction range 44, an angle range 45, an angle range 46, an angle range 47, and an angle range 48 as shown in (b) of FIG. 7 from the distribution angles of the 16 probe antenna models as shown in (b) of FIG. 7. Then, the probe antenna determination apparatus may determine N probe antenna models corresponding to the angle range 45, the angle range 46, the angle range 47, and the angle range 48, namely, 7 discontinuous probe antenna models filled with shadows as shown in (b) of FIG. 7. In this way, based on the 7 probe antenna models, 7 probe antennas that are consistent with spatial distribution of the 7 probe antenna models may be determined from the test environment in which the device under test is located, so that the 7 probe antennas may be used to test signal sending and receiving of the device under test. Therefore, a distribution density of the probe antenna for testing is maintained within an angle range corresponding to the concentration direction range of the radiation energy of the signal, so that the test accuracy of the antenna test system may be maintained.

Correspondingly, since only 7 probe antennas are required for the test, only a MIMO channel simulator of 14 channels is required to test the device under test. Therefore, compared with traditional use of 16 probe antennas, a quantity of probe antennas used is reduced, thereby reducing a quantity of required channels of the MIMO channel simulator, and reducing device requirements and costs of the test system.

In this embodiment of the present disclosure, since each distribution angle of the foregoing M probe antenna models may be corresponding to each direction radiating from the first signal, the probe antenna determination apparatus may accurately determine the foregoing at least one angle range based on the foregoing at least one direction range, so that N probe antenna models that can accurately send the first signal by analog may be precisely determined from the M probe antenna models, thereby improving the accuracy of the probe antenna determination apparatus for determining the probe antenna model corresponding to the probe antenna for testing the device under test.

According to the probe antenna determination method provided in the embodiments of the present disclosure, since the signal characteristic parameters of the first signal may accurately represent distribution of radiation energy of the first signal in various directions, the probe antenna determination apparatus may accurately simulate a radiation scenario of the first signal in a real environment based on the signal characteristic parameters of the first signal. In this way, N probe antenna models that can send the first signal more accurately may be selected based on the simulated radiation scenario, so that the probe antenna for testing the device under test may be determined based on the N probe antenna models. Therefore, these probe antennas may send the first signal more accurately, and the test accuracy of the antenna test system may be improved.

In this embodiment of the present disclosure, after the probe antenna determination apparatus determines the foregoing N probe antenna models, the probe antenna determination apparatus may first use the N probe antenna models to send the foregoing first signal by analog, and obtain an analog accuracy value (for example, the first accuracy value in the embodiments of the present disclosure) of a signal, relative to the first signal, that reaches a receive end by analog; then the probe antenna determination apparatus judges whether the analog accuracy value meets a preset accuracy value of the probe antenna determination apparatus, and adjusts, in a case that the analog accuracy value does not meet the preset accuracy value, the N probe antenna models determined by the probe antenna determination apparatus, until the accuracy value meets the preset accuracy value.

Figure 8:
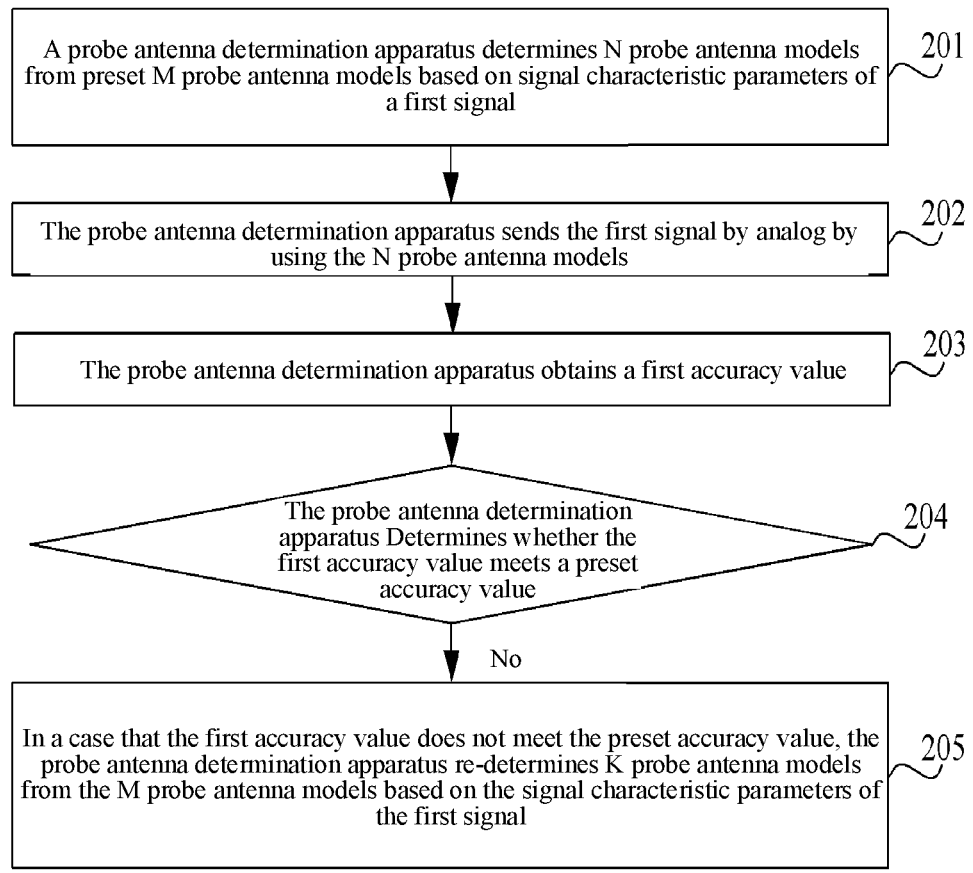
FIG. 8 is a fourth schematic diagram of a probe antenna determination method according to an embodiment of the present disclosure.

For example, with reference to FIG. 3, as shown in FIG. 8, after the foregoing step 201, the probe antenna determination method provided in the embodiments of the present disclosure may further include the following step 202 to step 205.

Step 202. The probe antenna determination apparatus sends the first signal by analog by using the N probe antenna models.

Step 203. The probe antenna determination apparatus obtains a first accuracy value.

The foregoing first accuracy value may be an analog accuracy value of a second signal relative to the first signal, and the second signal may be a signal that reaches a receive end after the first signal is sent by analog by using the foregoing N probe antenna models.

In this embodiment of the present disclosure, after the probe antenna determination apparatus determines the foregoing N probe antenna models, the probe antenna determination apparatus may use the N probe antenna models to send the first signal by analog, and the probe antenna may obtain (for example, calculating or analyzing) a signal (namely, the second signal) that reaches a receive end after the first signal is sent by analog by using the N probe antenna models, so that the foregoing first accuracy value may be obtained.

In this embodiment of the present disclosure, the foregoing first accuracy value may be determined based on radiation energy of the second signal and radiation energy of the first signal, or may be determined based on power of the second signal and power of the first signal. This may be specifically determined according to an actual usage requirement, and is not limited in this embodiment of the present disclosure.

For example, the foregoing first accuracy value may be a ratio between the radiation energy of the second signal and the radiation energy of the first signal, or a ratio between the power of the second signal and the power of the first signal, or a root mean square value of a difference between the radiation energy (or power) of the second signal and the radiation energy (or power) of the first signal.

Certainly, in actual implementation, the foregoing first accuracy value may also be obtained in any other possible manner, which specifically may be determined based on an actual use requirement and is not limited in the embodiments of the present disclosure.

Step 204. The probe antenna determination apparatus determines whether the first accuracy value meets a preset accuracy value.

In this embodiment of the present disclosure, after the probe antenna determination apparatus obtains the foregoing first accuracy value, the probe antenna determination apparatus may determine whether the first accuracy value meets the preset accuracy value, and if the first accuracy value meets the foregoing preset accuracy value, the probe antenna determination apparatus may output results of the determined N probe antenna models or any possible information such as the first accuracy value, so that the tester may select, based on the N probe antenna models, N probe antennas in the test environment in which the device under test is located, and use the N probe antennas to test the communication performance of the device under test. If the first accuracy value does not meet the preset accuracy value, the probe antenna determination apparatus may re-determine, based on the signal characteristic parameters of the first signal, a probe antenna model (for example, K probe antenna models in this embodiment of the present disclosure) that can send the first signal by analog more accurately.

In this embodiment of the present disclosure, if the foregoing first accuracy value does not meet the preset accuracy value, the first accuracy value may be smaller than the preset accuracy value, or the first accuracy value may be greater than the second accuracy value. This may be specifically determined according to an actual use requirement, and is not limited in this embodiment of the present disclosure.

In this embodiment of the present disclosure, the foregoing preset accuracy value may be a value preset by a tester for the probe antenna determination apparatus. This may be specifically determined according to an actual use requirement, and is not limited in the embodiments of the present disclosure.

Step 205. In a case that the first accuracy value does not meet the preset accuracy value, the probe antenna determination apparatus re-determines K probe antenna models from the M probe antenna models based on the signal characteristic parameters of the first signal.

The K probe antenna models may be partially or completely different from the N probe antenna models, and K is a positive integer.

In this embodiment of the present disclosure, in a case that the first accuracy value does not meet the preset accuracy value, the probe antenna determination apparatus may re-determine, based on the signal characteristic parameters of the first signal, a probe antenna model (namely, the foregoing K probe antenna models) used to determine a probe antenna for testing a device under test from the M probe antenna models until the first accuracy value meets the foregoing preset accuracy value.

In this embodiment of the present disclosure, there may be two manners in which the foregoing probe antenna determination apparatus re-determines the K probe antenna models, namely, a manner 1 and a manner 2. The two manners are illustrated below.

Manner 1: On the basis of the foregoing N probe antenna models, the probe antenna determination apparatus further selects i probe antenna models from the foregoing M probe antenna models to determine the foregoing K probe antenna models, where i is a positive integer.

In some embodiments, for the manner 1 described above, the foregoing K probe antenna models may be partially different from the foregoing N probe antenna models.

Manner 2: The probe antenna determination apparatus may re-determine at least one first direction range, and determine a probe antenna model corresponding to the at least one first direction range from the foregoing M probe antenna models, so as to determine the foregoing K probe antenna models.

In some embodiments, for the manner 2 described above, the foregoing K probe antenna models may be partially or completely different from the foregoing N probe antenna models. This may be specifically determined according to an actual use requirement, and is not limited in the embodiments of the present disclosure.

In this embodiment of the present disclosure, since the foregoing first accuracy value may indicate analog accuracy of a signal that reaches a receive end after the first signal is sent by analog by using the N probe antenna models relative to the first signal, the probe antenna determination apparatus may determine whether the determined N probe antenna models are suitable based on the first accuracy value. In a case that the foregoing N probe antenna models are not suitable, the probe antenna determination apparatus may re-determine a probe antenna model until a suitable probe antenna model is determined. In this way, a probe antenna capable of sending the first signal more accurately may be selected based on these suitable probe antenna models, thereby ensuring the accuracy of the antenna test system.

It should be noted that, in the embodiments of the present disclosure, the probe antenna determination method shown in each of the accompanying drawings is illustrated with reference to an accompanying drawing in the embodiments of the present disclosure. In a specific implementation, the probe antenna determination method shown in each of the accompanying drawings may also be implemented with reference to any other accompanying drawings that may be combined in the foregoing embodiments. Details are not described herein again.

Figure 9:
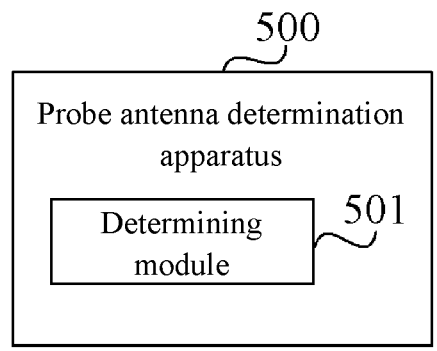
FIG. 9 is a first schematic structural diagram of a probe antenna determination apparatus according to an embodiment of the present disclosure.

As shown in FIG. 9, an embodiment of the present disclosure provides a probe antenna determination apparatus 500, and the probe antenna determination apparatus 500 includes a determination module 501. The determination module 501 is configured to determine N probe antenna models from preset M probe antenna models based on signal characteristic parameters of the first signal. The first signal is a signal obtained after a transmit signal of an analog system is processed by a wireless channel model, the signal characteristic parameters of the first signal include at least one of the following: a radiation energy value of the first signal in each direction and an angle power spectrum density of the first signal, the N probe antenna models are used to determine a probe antenna for testing a device under test, and both M and N are positive integers.

In some embodiments, the determination module 501 is specifically configured to determine at least one direction range based on the signal characteristic parameters of the first signal; and determine N probe antenna models corresponding to all direction ranges from the M probe antenna models, where the at least one direction range is determined from each direction radiating from the first signal, and a sum of radiation energy values in all the direction ranges is greater than or equal to a direction range of a preset threshold.

In some embodiments, the determination module 501 is further configured to: after determining the at least one direction range, determine, based on the at least one direction range, at least one angle range corresponding to each of the at least one direction range from each distribution angle of the M probe antenna models, where each distribution angle of the M probe antenna models is corresponding to each direction radiating from the first signal; and the determination module 501 is specifically configured to determine N probe antenna models corresponding to all angle ranges from the M probe antenna models.

Figure 10:
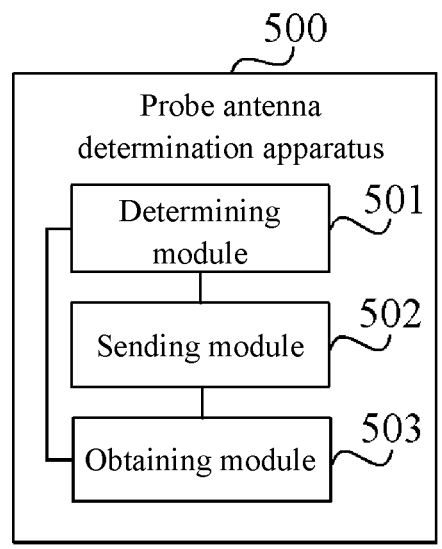
FIG. 10 is a second schematic structural diagram of a probe antenna determination apparatus according to an embodiment of the present disclosure.

In some embodiments, with reference to FIG. 9, as shown in FIG. 10, the probe antenna determination apparatus 500 further includes a sending module 502 and an obtaining module 503. The sending module 502 is configured to: after the determination module 501 determines the N probe antenna models from the M probe antenna models, send the first signal by analog by using the N probe antenna models; the obtaining module 503 is configured to obtain a first accuracy value, where the first accuracy value is an analog accuracy value of a second signal relative to the first signal that is sent by the sending module 502 by analog, and the second signal is a signal that reaches a receive end after the first signal is sent by analog by using the N probe antenna models; and the determination module 501 is further configured to: in a case that the first accuracy value obtained by the obtaining module 503 does not meet a preset accuracy value, re-determine K probe antenna models from the M probe antenna models based on the signal characteristic parameters of the first signal, where the K probe antenna models are partially or completely different from the N probe antenna models, and K is a positive integer.

In some embodiments, a spatial distribution of the M probe antenna models is consistent with the spatial distribution of the M probe antennas in the test environment in which the device under test is located.

The electronic device provided in this embodiment of the present disclosure can implement the processes that are implemented by the electronic device in the foregoing probe antenna determination method embodiment, and the same technical effects can be achieved. To avoid repetition, details are not described herein again.

According to the probe antenna determination apparatus provided in the embodiments of the present disclosure, since the signal characteristic parameters of the first signal may accurately represent the distribution of radiation energy of the first signal in various directions, the probe antenna determination apparatus may accurately simulate a radiation scenario of the first signal in a real environment based on the signal characteristic parameters of the first signal. In this way, N probe antenna models that can send the first signal more accurately may be selected based on the simulated radiation scenario, so that the probe antenna for testing the device under test may be determined based on the N probe antenna models. Therefore, these probe antennas may send the first signal more accurately, and the test accuracy of the antenna test system may be improved.

Figure 11:
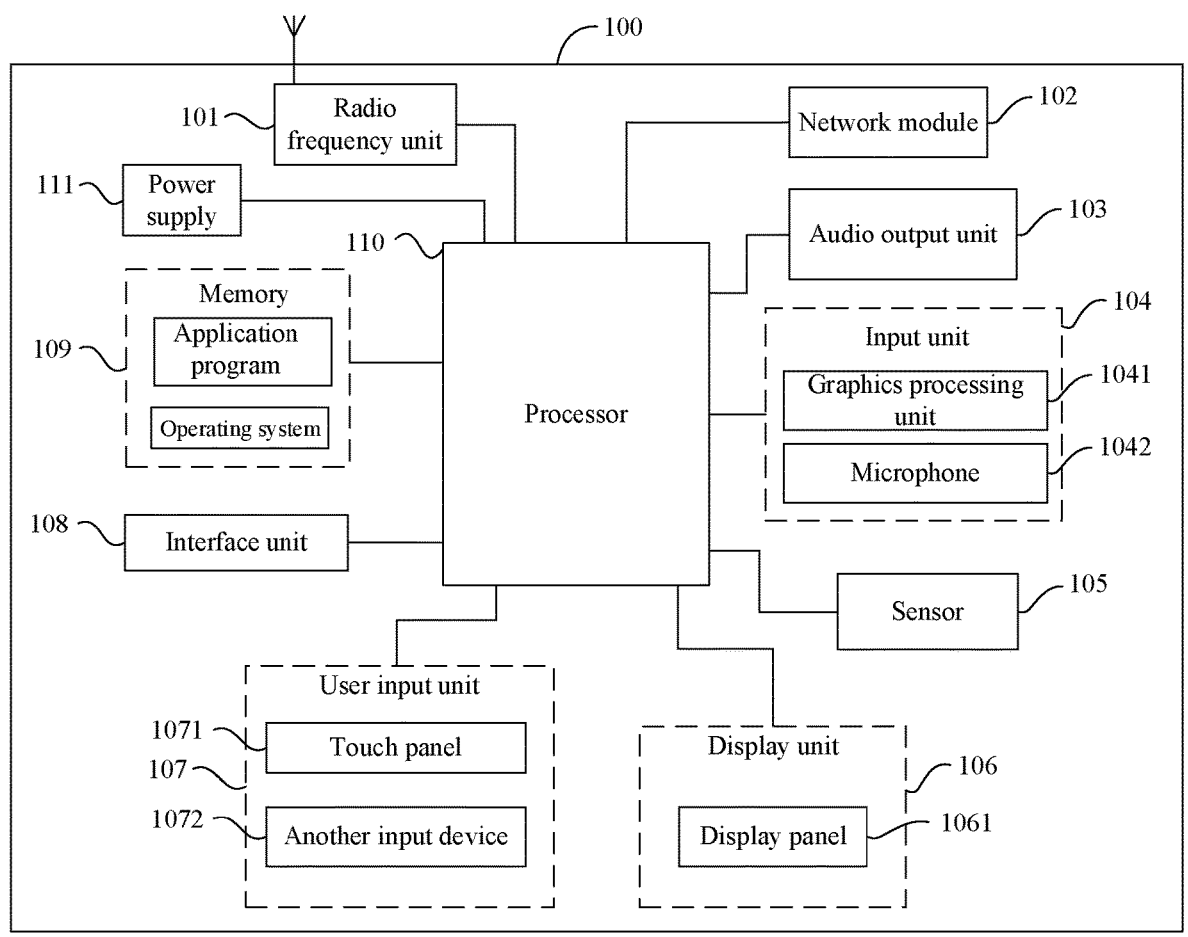
FIG. 11 is a schematic diagram of hardware of a probe antenna determination apparatus according to an embodiment of the present disclosure.

FIG. 11 is a schematic diagram of hardware of a probe antenna determination apparatus implementing the embodiments of the present disclosure. As shown in FIG. 11, the probe antenna determination apparatus 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that a probe antenna determination apparatus structure shown in FIG. 11 does not constitute any limitation on the probe antenna determination apparatus, and the probe antenna determination apparatus may include more or fewer components than those shown in the figure, or combine some components, or have different component arrangements. In this embodiment of the present disclosure, the probe antenna determination apparatus includes but is not limited to: a mobile phone, a tablet computer, a notebook computer, a palmtop computer, and the like.

The processor 110 may be configured to determine N probe antenna models from preset M probe antenna models based on signal characteristic parameters of the first signal. The first signal is a signal obtained after a transmit signal of an analog system is processed by a wireless channel model, the signal characteristic parameters of the first signal include at least one of the following: a radiation energy value of the first signal in each direction and an angle power spectrum density of the first signal, the N probe antenna models are used to determine a probe antenna for testing a device under test, and both M and N are positive integers.

It may be understood that, in this embodiment of the present disclosure, the determination module 501 in the schematic structural diagram (for example, FIG. 9) of the probe antenna determination apparatus may be implemented by the processor 110.

According to the probe antenna determination apparatus provided in the embodiments of the present disclosure, since the signal characteristic parameters of the first signal may accurately represent distribution of radiation energy of the first signal in various directions, the probe antenna determination apparatus may accurately simulate a radiation scenario of the first signal in a real environment based on the signal characteristic parameters of the first signal. In this way, N probe antenna models that can send the first signal more accurately may be selected based on the simulated radiation scenario, so that the probe antenna for testing the device under test may be determined based on the N probe antenna models. Therefore, these probe antennas may send the first signal more accurately, and the test accuracy of the antenna test system may be improved.

It should be understood that in this embodiment of the present disclosure, the radio frequency unit 101 may be configured to receive and transmit information, or receive and transmit signals during a call. Specifically, the radio frequency unit 101 receives downlink data from a base station, and transmits the downlink data to the processor 110 for processing; and in addition, transmits uplink data to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with another device by using a wireless communications system and network.

The probe antenna determination apparatus provides wireless broadband Internet access for a user by using a network module 102, for example, helping the user send and receive an email, browse a web page, and access streaming media.

The audio output unit 103 may convert audio data received by the radio frequency unit 101 or the network module 102 or stored in the memory 109 into an audio signal, and output the audio signal into sound. In addition, the audio output unit 103 may further provide audio output (for example, call signal receiving sound or message receiving sound) related to a specific function performed by the probe antenna determination apparatus 100. The audio output unit 103 includes a loudspeaker, a buzzer, a telephone receiver, and the like.

The input unit 104 is configured to receive an audio signal or a video signal. The input unit 104 may include a graphics processing unit (GPU) 1041 and a microphone 1042. The graphics processing unit 1041 processes image data of a still picture or a video obtained by an image capture apparatus (for example, a camera) in a video capture mode or an image capture mode. A processed image frame may be displayed on the display unit 106. The image frame processed by the graphics processing unit 1041 may be stored in the memory 109 (or another storage medium) or sent via the radio frequency unit 101 or the network module 102. The microphone 1042 may receive a sound and can process such a sound into audio data. The processed audio data may be converted, in a call mode, into a format that may be sent to a mobile communication base station by using the radio frequency unit 101 for output.

The probe antenna determination apparatus 100 further includes at least one sensor 105, for example, a light sensor, a motion sensor, or another sensor. Specifically, the light sensor includes an ambient light sensor and a proximity sensor. The ambient light sensor may adjust the luminance of the display panel 1061 based on the brightness of ambient light. The proximity sensor may turn off the display panel 1061 and/or backlight when the probe antenna determination apparatus 100 is moved to an ear. As a type of a motion sensor, an accelerometer sensor may detect acceleration values in directions (that are generally three axes), and detect a value and a direction of gravity when the accelerometer sensor is static, and may be configured to recognize the probe antenna determination apparatus (for example, screen switching between landscape and portrait modes, a related game, or magnetometer posture calibration), a function related to vibration recognition (for example, a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein again.

The display unit 106 is configured to display information entered by a user or information provided for a user. The display unit 106 may include the display panel 1061, and the display panel 1061 may be configured in a form of a liquid crystal display (LCD), an organic light-emitting diode (OLED), or the like.

The user input unit 107 may be configured to receive input digit or character information, and generate a key signal input related to a user setting and function control of the probe antenna determination apparatus. Specifically, the user input unit 107 includes a touch panel 1071 and another input device 1072. The touch panel 1071, also referred to as a touchscreen, may collect a touch operation of a user on or near the touch panel 1071 (for example, an operation performed by the user with any suitable object or accessory such as a finger or a stylus on or near the touch panel 1071).

The touch panel 1071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 110, and receives and executes a command from the processor 110. In addition, the touch panel 1071 may be implemented by using a plurality of types such as a resistive type, a capacitive type, an infrared ray, and a surface acoustic wave. In addition to the touch panel 1071, the user input unit 107 may further include another input device 1072. Specifically, input device 1072 may include but is not limited to a physical keyboard, function keys (for example, a volume control key and a power on/off button), a trackball, a mouse, and a joystick. Details are not described herein again.

Further, the touch panel 1071 may cover the display panel 1061. When detecting a touch operation on or near the touch panel 1071, the touch panel 1071 transmits the touch operation to the processor 110 to determine a type of touch event. Then, the processor 110 provides a corresponding visual output on the display panel 1061 based on the type of the touch event. In FIG. 11, although the touch panel 1071 and the display panel 1061 are used as two independent components to implement input and output functions of the probe antenna determination apparatus, in some embodiments, the touch panel 1071 and the display panel 1061 may be integrated to implement the input and output functions of the probe antenna determination apparatus. This is not specifically limited herein.

The interface unit 108 is an interface for connecting an external apparatus to the probe antenna determination apparatus 100. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, an earphone port, and the like. The interface unit 108 may be configured to receive input (for example, data information and power) from an external apparatus and transmit the received input to one or more elements within the probe antenna determination apparatus 100, or may be configured to transmit data between the probe antenna determination apparatus 100 and the external apparatus.

The memory 109 may be configured to store software programs and various data. The memory 109 may mainly include a program storage area and a data storage area. The program storage area may store an operating system, an application required for at least one function (for example, a sound playback function or an image playback function), and the like. The data storage area may store data (for example, audio data or an address book) or the like created based on use of the mobile phone. In addition, the memory 109 may include a high-speed random access memory, and may further include a non-volatile memory such as at least one magnetic disk storage device, a flash memory device, or another volatile solid-state storage device.

The processor 110 is a control center of the probe antenna determination apparatus, connects various parts of the entire probe antenna determination apparatus by using various interfaces and circuits, and performs various functions of the probe antenna determination apparatus and processes data by running or executing software programs and/or modules stored in the memory 109 and invoking data stored in the memory 109, to perform overall monitoring on the probe antenna determination apparatus. The processor 110 may include one or more processing units. In some embodiments, the processor 110 may be integrated with an application processor and a modem processor. The application processor mainly processes an operating system, a user interface, an application program, and the like, and the modem processor mainly processes wireless communication. It may be understood that, alternatively, the modem processor may not be integrated into the processor 110.

The probe antenna determination apparatus 100 may further include the power supply 111 (for example, a battery) configured to supply power to various components. In some embodiments, the power supply 111 may be logically connected to the processor 110 through a power management system, so as to implement functions such as managing charging, discharging, and power consumption through the power management system.

In addition, the probe antenna determination apparatus 100 includes some function modules not shown. Details are not described herein again.

An embodiment of the present disclosure further provides a probe antenna determination apparatus, including a processor 110 and a memory 109 that are shown in FIG. 11, and a computer program stored in the memory 109 and executable on the processor 110, where the computer program, when executed by the processor 110, implements processes of the foregoing probe antenna determination method embodiments, and the same technical effects can be achieved. To avoid repetition, details are not described herein again.

An embodiment of the present disclosure further provides a non-transitory computer-readable storage medium, where the non-transitory computer-readable storage medium stores a computer program, where the computer program, when executed by the processor shown in FIG. 11, implements processes of the foregoing probe antenna determination method embodiments, and the same technical effects can be achieved. To avoid repetition, details are not described herein again. The computer-readable storage medium may include a read-only memory (ROM), a random access memory (RAM), a magnetic disk, an optical disc, or the like.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. An element limited by "includes a . . . " does not, without more constraints, preclude the presence of additional identical elements in the procedure, method, article, or apparatus that includes the element.

According to the foregoing descriptions of the implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to related technologies may be implemented in a form of a software product. The computer software product is stored in a storage medium (such as a ROM/RAM, a magnetic disk, or an optical disc), and includes several instructions for instructing an electronic device (which may be a mobile phone, a computer, a server, an air conditioner, a network device, or the like) to perform the methods described in the embodiments of the present disclosure.

The embodiments of the present disclosure are described above with reference to the accompanying drawings. However, the present disclosure is not limited to the foregoing specific implementations. The foregoing specific implementations are merely exemplary, but are not limiting. Under the enlightenment of the present disclosure, a person of ordinary skill in the art may make many forms without departing from the objective and the scope of the claims of the present disclosure, and all of which fall within the protection of the present disclosure.

The invention claimed is:

1. A method of probe antenna determination, performed by a probe antenna determination apparatus, comprising:
    determining N probe antenna models from M preset probe antenna models based on signal characteristic parameters of a first signal, wherein the first signal is a signal obtained after a transmit signal of an analog system is processed by a wireless channel simulator, each probe antenna model is a model of a corresponding probe antenna used for simulation by the wireless channel simulator, and the signal characteristic parameters comprise at least one of the following: a radiation energy value of the first signal in each direction and an angle power spectrum density of the first signal, wherein the N probe antenna models are used to determine a probe antenna for testing a device under test, and both M and N are positive integers.

2. The method according to claim 1, wherein determining the N probe antenna models from the M preset probe antenna models based on signal characteristic parameters comprises:
    determining at least one direction range based on the signal characteristic parameters, wherein the at least one direction range is determined from each direction radiating from the first signal, and a sum of radiation energy values in all direction ranges is greater than or equal to a preset threshold; and
    determining N probe antenna models corresponding to all the direction ranges from the M probe antenna models.

3. The method according to claim 2, wherein after determining the at least one direction range, the method further comprises:
    determining, based on the at least one direction range, an angle range corresponding to each of the at least one direction range from each distribution angle of the M probe antenna models, wherein each distribution angle of the M probe antenna models is corresponding to each direction radiating from the first signal; and
    determining the N probe antenna models corresponding to all the direction ranges from the M probe antenna models comprises:
    determining N probe antenna models corresponding to all angle ranges from the M probe antenna models.

4. The method according to claim 1, wherein after determining the N probe antenna models from the M preset probe antenna models, the method further comprises:
    sending the first signal by analog by using the N probe antenna models;
    obtaining a first accuracy value, wherein the first accuracy value is an analog accuracy value of a second signal relative to the first signal, and the second signal is a signal that reaches a receive end after the first signal is sent by analog by using the N probe antenna models; and
    in a case that the first accuracy value does not meet a preset accuracy value, re-determining K probe antenna models from the M probe antenna models based on the signal characteristic parameters,
    wherein the K probe antenna models are partially or completely different from the N probe antenna models, and K is a positive integer.

5. The method according to claim 1, wherein a spatial distribution of the M probe antenna models is consistent with the spatial distribution of NI probe antennas in a test environment in which the device under test is located.

6. A probe antenna determination apparatus, comprising:
    a memory storing a computer program; and
    a processor coupled to the memory and configured to execute the computer program to perform a method of probe antenna determination, the method comprising:
    determining N probe antenna models from M preset probe antenna models based on signal characteristic parameters of a first signal, wherein the first signal is a signal obtained after a transmit signal of an analog system is processed by a wireless channel simulator, each probe antenna model is a model of a corresponding probe antenna used for simulation by the wireless channel simulator, and the signal characteristic parameters comprise at least one of the following: a radiation energy value of the first signal in each direction and an angle power spectrum density of the first signal, wherein the N probe antenna models are used to determine a probe antenna for testing a device under test, and both M and N are positive integers.

7. The probe antenna determination apparatus according to claim 6, wherein determining the N probe antenna models from the M preset probe antenna models based on signal characteristic parameters comprises:
    determining at least one direction range based on the signal characteristic parameters, wherein the at least one direction range is determined from each direction radiating from the first signal, and a sum of radiation energy values in all direction ranges is greater than or equal to a preset threshold; and
    determining N probe antenna models corresponding to all the direction ranges from the M probe antenna models.

8. The probe antenna determination apparatus according to claim 7, wherein after determining the at least one direction range, the method further comprises:
    determining, based on the at least one direction range, an angle range corresponding to each of the at least one direction range from each distribution angle of the M probe antenna models, wherein each distribution angle of the M probe antenna models is corresponding to each direction radiating from the first signal; and
    determining the N probe antenna models corresponding to all the direction ranges from the M probe antenna models comprises:
    determining N probe antenna models corresponding to all angle ranges from the M probe antenna models.

9. The probe antenna determination apparatus according to claim 6, wherein after determining the N probe antenna models from the M preset probe an antenna models, the method further comprises:
    sending the first signal by analog by using the N probe antenna models;
    obtaining a first accuracy value, wherein first accuracy value is an analog accuracy value of a second relative to the first signal, and the second signal is a signal that reaches a receive end after the first signal is sent by analog by using the N probe antenna models; and in a case that the first accuracy value does not meet a preset accuracy value, re-determining K probe antenna models from the M probe antenna models based on the signal characteristic parameters, wherein the K probe antenna models are partially or completely different from the N probe antenna models, and K is a positive integer.

10. The probe antenna determination apparatus according to claim 6, wherein a spatial distribution of the M probe antenna models is consistent with the spatial distribution of NI probe antennas in a test environment in which the device under test is located.

11. A non-transitory computer-readable storage medium storing a computer program, when executed by a processor, implements a method of probe antenna determination, the method comprising:

determining N probe antenna models from M preset probe antenna models based on signal characteristic parameters of a first signal, wherein the first signal is a signal obtained after a transmit signal of an analog system is processed by a wireless channel simulator, each probe antenna model is a model of a corresponding probe antenna used for simulation by the wireless channel simulator, and the signal characteristic parameters comprise at least one of the following: a radiation energy value of the first signal in each direction and an angle power spectrum density of the first signal, wherein the N probe antenna models are used to determine a probe antenna for testing a device under test, and both NI and N are positive integers.

12. The non-transitory computer-readable storage medium according to claim 11, wherein determining the N probe antenna models from the M preset probe antenna models based on signal characteristic parameters comprises:

determining at least one direction range based on the signal characteristic parameters, wherein the at least one direction range is determined from each direction radiating from the first signal, and a sum of radiation energy values in all direction ranges is greater than or equal to a preset threshold; and determining N probe antenna models corresponding to all the direction ranges from the M probe antenna models.

13. The non-transitory computer-readable storage medium according to claim 12, wherein after determining the at least one direction range, the method further comprises:

determining, based on the at least one direction range, an angle range corresponding to each of the at least one direction range from each distribution angle of the M probe antenna models, wherein each distribution angle of the M probe antenna models is corresponding to each direction radiating from the first signal; and determining the N probe antenna models corresponding to all the direction ranges from the M probe antenna models comprises:

determining N probe antenna models corresponding to all angle ranges from the M probe antenna models.

14. The non-transitory computer-readable storage medium according to claim 11, wherein after determining the N probe antenna models from the M preset probe antenna models, the method further comprises:

sending the first signal by analog by using the N probe antenna models;

obtaining a first accuracy value, wherein the first accuracy value is an analog accuracy value of a second signal relative to the first signal, and the second signal is a signal that reaches a receive end after the first signal is sent by analog by using the N probe antenna models; and in a case that the first accuracy value does not meet a preset accuracy value, re-determining K probe antenna models from the M probe antenna models based on the signal characteristic parameters, wherein the K probe antenna models are partially or completely different from the N probe antenna models, and K is a positive integer.

15. The non-transitory computer-readable storage medium according to claim 11, wherein a spatial distribution of the M probe antenna models is consistent with the spatial distribution of M probe antennas in a test environment in which the device under test is located.

* * * * *